July 7, 1925.

A. B. CELANDER

DIFFERENTIAL SPIDER

Filed Sept. 12, 1923

1,544,805

Inventor:
Alfred B. Celander
by R.W. Smith
Attorney

Patented July 7, 1925.

1,544,805

UNITED STATES PATENT OFFICE.

ALFRED B. CELANDER, OF OAKLAND, CALIFORNIA.

DIFFERENTIAL SPIDER.

Application filed September 12, 1923. Serial No. 662,178.

*To all whom it may concern:*

Be it known that I, ALFRED B. CELANDER, a citizen of the United States of America, residing in the city of Oakland, county of Alameda, and State of California, have invented certain new and useful Improvements in Differential Spiders, of which the following is a specification.

Differential gears are in common use in the rear axle of automobiles to allow the rear wheels to turn unequally in rounding curves or traveling over rough ground without disturbing the positive drive connection.

Figure 1:
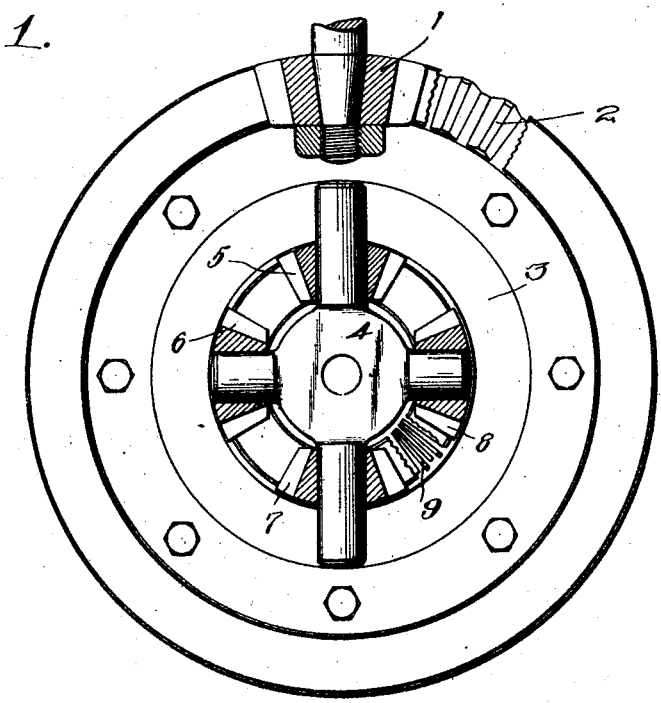
Figure 3:
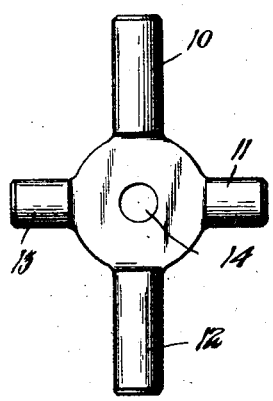
Figure 2:
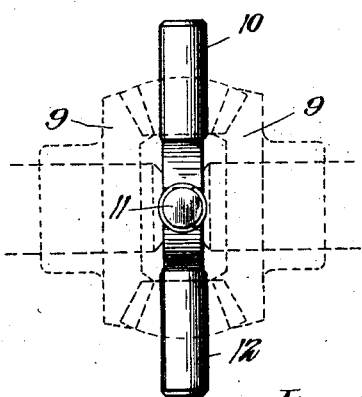

The single drawing attached shows in Figure 1 a vertical section thru the differential in the plane of the engine drive shaft. Fig. 2 outlines a vertical section thru the differential in the plane of the drive axles. Fig. 3 shows the general type of interchangeable spider described in the specification following:

Referring to Fig. 1: The power of the engine drive shaft is transmitted thru a bevel pinion (1), to a master gear (2), the latter rigidly connected to a casing (3) which carries a spider (4), forming the support of a plurality of bevel pinions (5), (6), (7) and (8), meshing with the drive gears (9) rigidly mounted on each drive axle as indicated in Fig. 2. Failure of this unit often occurs because of overloading or of axial displacement of the differential bevel pinions which transmit the power to the axles while allowing for their relative motion. The standard method of increasing this strength requires re-designing, and alteration of expensive tools and machinery used in fabrication; it renders many standard parts obsolete, and, in the case of large production, causes large losses and much inconvenience.

The improvement which this invention achieves is that the number of differential bevel pinions can be easily increased, and thus provide for transmitting additional torque simply by installing a multi-way spider in the original supports. This also reduces the end thrust of each pinion, minimizing the wear incident thereto. A further advantage is that this spider is, in a sense, floating, and thus allows the several pinions as a unit to operate about a true load center, equalizing the load on each pinion.

A four-way spider is particularly useful where, in the case of inadequacy of the two original differential pinions (5) and (7), Fig. 1, twice as many pinions (5), (6), (7) and (8) can be inserted in their place. This is done by substituting for the original spider which consisted of only two arms (10) and (12) in Fig. 3, a new spider of four arms in which the two new arms (11) and (13) are of such length as to adequately carry the extra pinions, but not long enough to prevent insertion into the original differential casing, in this way departing from the standard practice of providing a casing support for each arm. A more powerful transmission unit is thus effected by the simple substitution of only one part and the addition of other standard parts. The operating conditions are improved in the decreased end thrust and tooth pressure of the bevel pinions, and it is no longer necessary to keep the spider from rotating about the axis of two pinions or from slipping axially. A pilot hole (14) is shown in the drawing for manufacturing purposes, but this can be filled subsequently if desired, as would be necessary if the entire surface is needed to properly transmit the thrust of the drive axles.

Obviously this same invention can be applied to other than the two-support, four-way spider here pictured and described, the number of supports and limitation of extra arms depending wholly upon mechanical construction of the original differential. It is understood that the system above described may be modified within the scope of the following claims to adapt the system to various types of differentials without departing from the spirit of the invention.

What is claimed is:

1. In a differential, a casing and a differential spider having gear carrying arms engaging the differential casing and gear carrying arms free of engagement with the differential casing.

2. In a differential, a differential spider having gear carrying arms adapted to engage with the differential casing and shorter gear carrying arms having their ends free of the differential casing and lying between said first mentioned arms, said spider being adapted to be substituted for a spider having an equal number of casing supported gear carrying arms without changing said casing.

3. In a differential, a differential spider having gear carrying arms adapted to be supported by the differential casing and shorter gear carrying arms adapted to be free of engagement with said casing, said spider being adapted to be substituted for a spider having the same number of casing supported gear carrying arms.

4. In a differential, a differential spider having a plurality of gear carrying arms engaging the differential casing and a plurality of shorter gear carrying arms alternating with said first mentioned arms and having their outer ends free of said casing.

In testimony whereof, I affix my signature.

ALFRED B. CELANDER.

Witnesses:
JOSEPH C. A. STRAUB,
FREDERICK S. BROOKS.